US012141897B2

(12) United States Patent
Park et al.

(10) Patent No.: US 12,141,897 B2
(45) Date of Patent: Nov. 12, 2024

(54) METHOD AND DEVICE FOR REGULARIZING RAPID THREE-DIMENSIONAL TOMOGRAPHIC IMAGING USING MACHINE-LEARNING ALGORITHM

(71) Applicant: TOMOCUBE, INC., Daejeon (KR)

(72) Inventors: YongKeun Park, Daejeon (KR); Donghun Ryu, Daejeon (KR); HyunSeok Min, Daejeon (KR); Dongmin Ryu, Daejeon (KR)

(73) Assignee: TOMOCUBE, INC., Daejeon (KR)

( * ) Notice: Subject to any disclaimer, the term of this patent is extended or adjusted under 35 U.S.C. 154(b) by 232 days.

(21) Appl. No.: 17/753,452

(22) PCT Filed: Jan. 6, 2021

(86) PCT No.: PCT/KR2021/000128
§ 371 (c)(1),
(2) Date: Mar. 3, 2022

(87) PCT Pub. No.: WO2021/167241
PCT Pub. Date: Aug. 26, 2021

(65) Prior Publication Data
US 2022/0383562 A1 Dec. 1, 2022

(30) Foreign Application Priority Data
Feb. 19, 2020 (KR) .......... 10-2020-0020158

(51) Int. Cl.
*G06T 11/00* (2006.01)
*G06V 10/82* (2022.01)

(52) U.S. Cl.
CPC .......... *G06T 11/003* (2013.01); *G06V 10/82* (2022.01); *G06T 2210/41* (2013.01)

(58) Field of Classification Search
CPC .............. G06T 11/003; G06T 2210/41; G06T 2211/436; G06T 2211/441; G06T 11/005;
(Continued)

(56) References Cited

U.S. PATENT DOCUMENTS 10,729,397 B2 * 8/2020 Wang .................. A61B 6/4291
10,845,759 B2 * 11/2020 Sung .................... G02B 21/14
(Continued)

FOREIGN PATENT DOCUMENTS

CN  110706298 A  *  1/2020  .......... G06T 11/006
JP  2019093137 A     6/2019
(Continued)

OTHER PUBLICATIONS

PCT International Search Report for International Application No. PCT/KR2021/000128, dated Apr. 5, 2021, 7 pages.
(Continued)

*Primary Examiner* — Qun Shen
(74) *Attorney, Agent, or Firm* — Hoffman Warnick LLC

(57) ABSTRACT

Proposed are a method and device for regularizing rapid three-dimensional tomographic imaging using a machine-learning algorithm. A method for regularizing three-dimensional tomographic imaging using a machine-learning algorithm according to an embodiment comprises the steps of: measuring a three-dimensional tomogram of a cell to acquire a raw tomogram of the cell; acquiring a regularized tomogram by using a regularization algorithm; and learning the relationship between the raw tomogram and the regularized tomogram through machine-learning.

4 Claims, 9 Drawing Sheets

(58) Field of Classification Search
CPC .......... G06V 10/82; G06N 3/045; G06N 3/08; G06N 3/02; G06N 20/00; G01N 21/45; G01N 2021/1787
See application file for complete search history.

(56) References Cited

U.S. PATENT DOCUMENTS

| | | | | |
|---|---|---|---|---|
| 2015/0157286 | A1* | 6/2015 | Wang | A61B 6/485 600/426 |
| 2017/0213364 | A1* | 7/2017 | Sperl | G06T 11/005 |
| 2019/0163132 | A1* | 5/2019 | Sung | G03H 1/0443 |
| 2019/0378311 | A1* | 12/2019 | Mailhe | G16H 50/20 |
| 2020/0090384 | A1* | 3/2020 | Atria | G06T 11/006 |

FOREIGN PATENT DOCUMENTS

| | | | | |
|---|---|---|---|---|
| KR | 20170140473 | A | 12/2017 | |
| KR | 101926181 | B1 | 12/2018 | |
| KR | 20200006016 | A | 1/2020 | |
| WO | WO-2013134949 | A1 * | 9/2013 | .......... A61B 5/0086 |

OTHER PUBLICATIONS

Huang et al., "Traditional Machine Learning for Limited Angle Tomography," International Journal of Computer Assisted Radiology and Surgery, 2019, 14: pp. 11-19.

Lim et al., "Comparative study of iterative reconstruction algorithms for missing cone problems in optical diffraction tomography," Optical Society of America, 2015, 16 pages.

Park et al., "Quantitative phase imaging in biomedicine," Nature Photonics, vol. 12, Oct. 2018, 578-589.

Wolf, "Three-Dimensional Structure Determination of Semi-Transparent Objects From Holographic Data," Optics Communications, vol. 1, No. 4, Sep./Oct. 1969. techniques for the study of cell pathophysiology, Journal of Biomedical (2016).

Kim et al., Optical diffraction tomography Photonics & Engineering 2(2), 16 pages.

* cited by examiner

METHOD AND DEVICE FOR REGULARIZING RAPID THREE-DIMENSIONAL TOMOGRAPHIC IMAGING USING MACHINE-LEARNING ALGORITHM

TECHNICAL FIELD

The following embodiments relate to a method and apparatus for rapidly regularizing three-dimensional (3-D) tomography using a machine learning algorithm.

BACKGROUND ART

A current 3-D tomography technology has low resolution in the direction of an optical axis because spatial frequency information in the corresponding direction is not measured due to a physical limit of an optical lens. In order to overcome such a problem, spatial frequency information that is not measured is filled by using an iteration-based regularization algorithm using known information or assumption of a sample.

Common regularization algorithms include non-negativity using an assumption that the background of a sample has a value equal to or greater than a specific value, a total variation using an assumption that a 3-D tomogram of a sample has a small image gradient, etc.

In particular, a regularization algorithm, such as the total variation, is commonly used because it can effectively increase resolution of a 3-D image in the direction of an optical axis, but has a disadvantage in that several minutes to several hours of a calculation time are taken because a regularized 3-D tomographic image is obtained by iteratively calculating a gradient descent. Furthermore, there is a problem in that a user has to find out optimum results in a trial and error manner by putting several parameters because algorithmic parameters suitable for each sample are different.

(Non-patent Document 1) Kim, K., et al. (2016). "Optical diffraction tomography techniques for the study of cell pathophysiology." arXiv preprint arXiv:1603.00592.

(Non-patent Document 2) Wolf, E. (1969). "Three-dimensional structure determination of semi-transparent objects from holographic data." Optics Communications 1(4): 153-156.

(Non-patent Document 3) Lim, J. (2015). "Comparative study of iterative reconstruction algorithms for missing cone problems in optical diffraction tomography." Optics Express 23(13): 16933-16948.

(Non-patent Document 4) Park, Y. (2018). "Quantitative phase imaging in biomedicine." Nature Photonics 12(10): 578-589.

DISCLOSURE

Technical Problem

Embodiments describe a method and apparatus for rapidly regularizing 3-D tomography using a machine learning algorithm, and more specifically, provide a technology for providing the rapid regularization of a tomographic image through a deep learning algorithm that learns a feature of a regularization algorithm, such as a total variation, without a process of finding the optimization or parameter of an algorithm.

Embodiments provide a method and apparatus for rapidly regularizing 3-D tomography using a machine learning algorithm, which increase resolution by learning a non-linear relation between a 3-D tomogram that is first optically imaged and a regularized 3-D tomogram thereof through deep learning and regularizing a newly imaged 3-D tomogram within several seconds.

Technical Solution

A method of regularizing three-dimensional (3-D) tomography using a machine-learning algorithm according to an embodiment may include obtaining a raw tomogram of a cell by measuring a 3-D tomogram of a cell, obtaining a regularized tomogram by using a regularization algorithm, and learning a relation between the raw tomogram and the regularized tomogram through a machine-learning algorithm.

Furthermore, the method may further include regularizing the measured 3-D tomogram of the cell by using the trained machine-learning algorithm.

Obtaining a raw tomogram of a cell by measuring a 3-D tomogram of a cell may include measuring a 3-D refractive index image of the cell by using an incident light rotation method using illumination at a plurality of angles or obtaining a 3-D refractive index image of the cell by using a plurality of two-dimensional (2-D) images measured while rotating the cell (sample rotation) or translating the cell.

Obtaining a raw tomogram of a cell by measuring a 3-D tomogram of a cell may include obtaining a regulated refractive index image corresponding to each image through total variation regularization, and forming a paired dataset of the raw tomogram and the regularized tomogram.

Learning a relation between the raw tomogram and the regularized tomogram through a machine-learning algorithm may include extracting a specific feature of a cell type by learning a non-linear relation between paired datasets of the raw tomogram and the regularized tomogram through the machine-learning algorithm.

Regularizing the measured 3-D tomogram of the cell by using the machine-learning algorithm may include outputting the regularized tomogram by inputting the measured raw tomogram to a convolutional neural network (CNN) algorithm, and identifying the type of cell by applying the regularized tomogram.

Regularizing the measured 3-D tomogram of the cell by using the machine-learning algorithm may include a contraction path of extracting a specific feature from raw tomogram data of the cell through sequential application of convolution and subsampling for each path, and an expansion path of outputting regularized tomogram data having a size identical with an input value through the sequential application of convolution and subsampling for each path.

An apparatus for regularizing three-dimensional (3-D) tomography using a machine-learning algorithm according to another embodiment may include a 3-D tomogram measurement unit configured to obtain a raw tomogram of a cell by measuring a 3-D tomogram of a cell, a regularization algorithm configured to obtain a regularized tomogram, and a machine-learning algorithm configured to learn a relation between the raw tomogram and the regularized tomogram.

Furthermore, the apparatus may further include a regularization unit configured to regularize the measured 3-D tomogram of the cell by using the trained machine-learning algorithm.

The regularization unit may output the regularized tomogram by inputting the measured raw tomogram to a convolutional neural network (CNN) algorithm, and may identify the type of cell by applying the regularized tomogram.

Advantageous Effects

According to embodiments, there can be provided the method and apparatus for rapidly regularizing 3-D tomography using a machine learning algorithm, which provide a deep learning-based regularization method 10 times faster than the existing regularization method used in a 3-D tomography technology by providing the rapid regularization of a tomographic image through a deep learning algorithm that learns a feature of a regularization algorithm, such as a total variation.

According to embodiments, there can be provided the method and apparatus for rapidly regularizing 3-D tomography using a machine learning algorithm, which increase resolution by leaning a non-linear relation between a 3-D tomogram that is first optically imaged and a regularized 3-D tomogram thereof through deep learning and regularizing a newly imaged 3-D tomogram within several seconds.

BEST MODE

Figure 1:
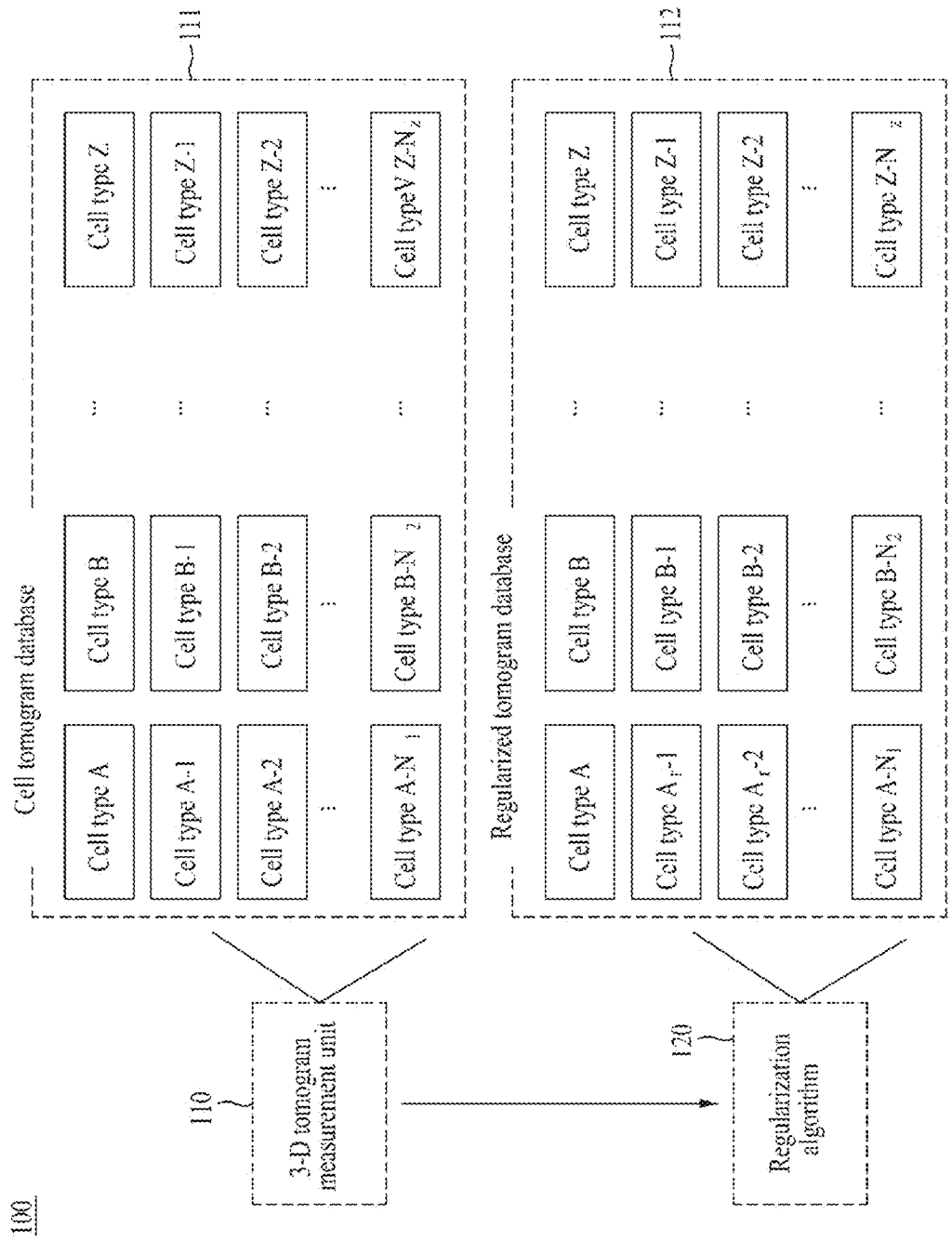
FIG. 1 is a diagram schematically describing a method of regularizing 3-D tomography using a machine-learning algorithm according to an embodiment.

Hereinafter, embodiments are described with reference to the accompanying drawings. However, the described embodiments may be modified in various other forms, and the scope of the present disclosure is not restricted by the following embodiments. Furthermore, various embodiments are provided to more fully describe the present disclosure to a person having average knowledge in the art. The shapes, sizes, etc. of elements in the drawings may be exaggerated for a clear description.

A three-dimensional (3-D) tomography technology widely used in life science and medicine cannot physically obtain all of pieces of spatial frequency information ($k_z$) corresponding to the direction of an optical axis (z coordinates in a common x, y, z coordinate system) because an angle at which a sample may be physically illuminated and an angle at which scattered light is obtained from a sample are limited due to a light acquisition limit (e.g., a numerical aperture) of a lens. For this reason, there are problems in that resolution in the direction of the optical axis is reduced and the results of a restoration 3-D image are distorted in the z direction. In general, this is called a missing cone problem.

In order to solve such a missing cone problem, it is very important to perform post-processing by using a computational regularization algorithm (Non-patent Document 3). However, in general, a conventional regularization algorithm taken from several minutes to several hours is incapable of the real-time 3-D visualization of a sample. Accordingly, it is necessary to develop a rapid regularization algorithm.

The following embodiments provide a method and apparatus for rapidly regularizing 3-D tomography using a machine learning algorithm, and provide a deep learning-based regularization method 10 times faster than the existing regularization method used in the 3-D tomography technology.

More specifically, embodiments are intended to increase resolution by learning a non-linear relation between a 3-D tomogram that is first optically imaged and a regularized 3-D tomogram thereof through deep learning, such as a convolutional neural network (CNN) algorithm, and regularizing a newly imaged 3-D tomogram within several seconds, instead of regularizing a total variation-based iterative algorithm in which a missing cone degrading resolution in the direction of an optical axis is taken from several minutes to several hours in the 3-D tomography technology.

FIG. 1 is a diagram schematically describing a method of regularizing 3-D tomography using a machine-learning algorithm according to an embodiment.

An object of the present embodiment is to provide the rapid regularization of a tomographic image through a deep learning algorithm that learns a feature of a regularization algorithm, such as a total variation, without a process of finding out the optimization or parameter of an algorithm.

The 3-D tomography technology may generate a 3-D image by synthesizing several sheets of two-dimensional (2-D) images obtained by illumination at several angles, rotating a sample, or translating the sample.

Since an angle permitted in a lens cannot exceed a specific range, an angle range of a light source incident on a sample and an angle range in which light scattered from the sample is obtained are physically restricted by the numerical aperture (NA) of each lens. Due to such a missing cone problem, all of pieces of spatial frequency information in the direction of an optical axis are not practically obtained, and corresponding resolution is degraded. Such a missing cone problem is subsequently filled by a computational regularization algorithm. Lots of conventional regularization methods require a long time because a regularization image is iteratively found. Accordingly, it is necessary to reduce a regularization running time through high-specification computing power or algorithm optimization, but regularization having a several-second level is impossible according to a current technology level.

Referring to FIG. 1, a 3-D tomogram of a cell may be measured by using a 3-D tomogram measurement unit 110 according to an embodiment. A regularized tomogram may be obtained by using the existing regularization algorithm 120, such as a total variation. In this case, a cell raw tomogram database 111 may be constructed by measuring the 3-D tomogram of the cell through the 3-D tomogram measurement unit 110. A regularized tomogram database may be constructed through the regularization algorithm 120.

Thereafter, as the results of learning through a machine-learning algorithm for complicated mapping between the raw tomogram and the regularized tomogram, a newly measured 3-D tomogram of the cell can be regularized without separate additional optimization.

According to embodiments, a distribution (image) of 3-D refractive indices of a sample, such as a live cell, can be measured without using dyeing or labeling. The type of cell can be identified based on the distribution. If a distribution of 3-D refractive indices is used, the type of cell can be identified based on a specific morphological feature and biochemical characteristic of a cell type. In particular, the type of cell can be identified simply and accurately by measuring a 3-D refractive index of a cell and applying the measured value to a machine-learning algorithm.

Figure 2:
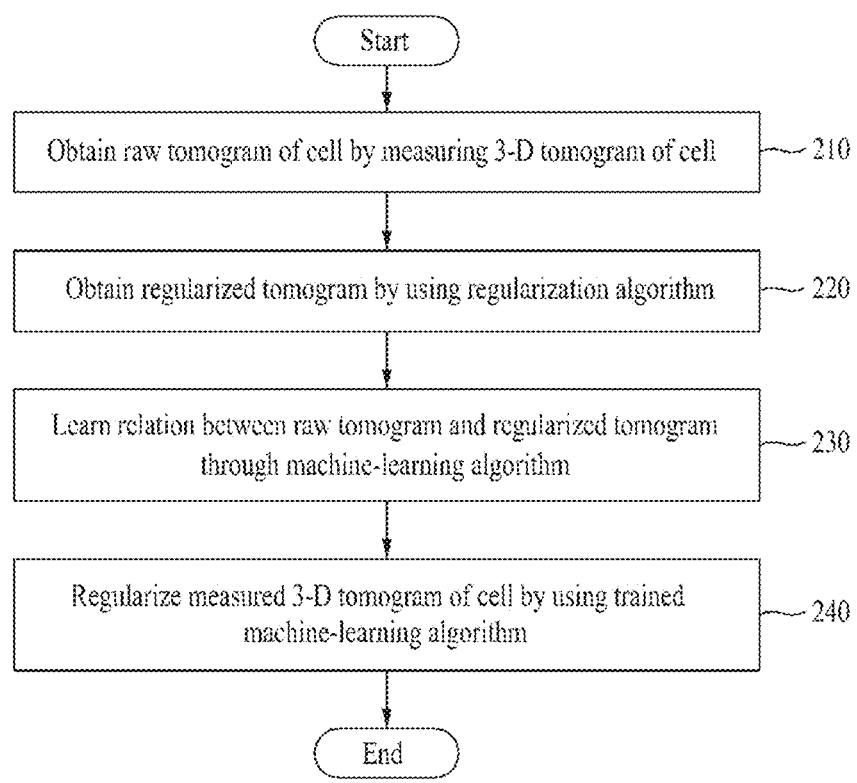
FIG. 2 is a flowchart illustrating a method of regularizing 3-D tomography using a machine-learning algorithm according to an embodiment.

FIG. 2 is a flowchart illustrating a method of regularizing 3-D tomography using a machine-learning algorithm according to an embodiment.

Referring to FIG. 2, the method of regularizing 3-D tomography using a machine-learning algorithm according to an embodiment may include a step 210 of obtaining a raw tomogram of a cell by measuring a 3-D tomogram of the cell, a step 220 of obtaining a regularized tomogram by using a regularization algorithm, and a step 230 of learning a relation between the raw tomogram and the regularized tomogram through a machine-learning algorithm.

Furthermore, the method may further include a step 240 of regularizing the measured 3-D tomogram of the cell by using the trained machine-learning algorithm.

According to embodiments, resolution can be increased by learning a non-linear relation between a 3-D tomogram that is first optically imaged and a regularized 3-D tomogram thereof through deep learning and regularizing a newly imaged 3-D tomogram within several seconds.

The steps of the method of regularizing 3-D tomography using a machine-learning algorithm according to an embodiment are more specifically described below.

The method of regularizing 3-D tomography using a machine-learning algorithm according to an embodiment may be described by taking, as an example, an apparatus for regularizing 3-D tomography using a machine-learning algorithm according to an embodiment.

Figure 3:
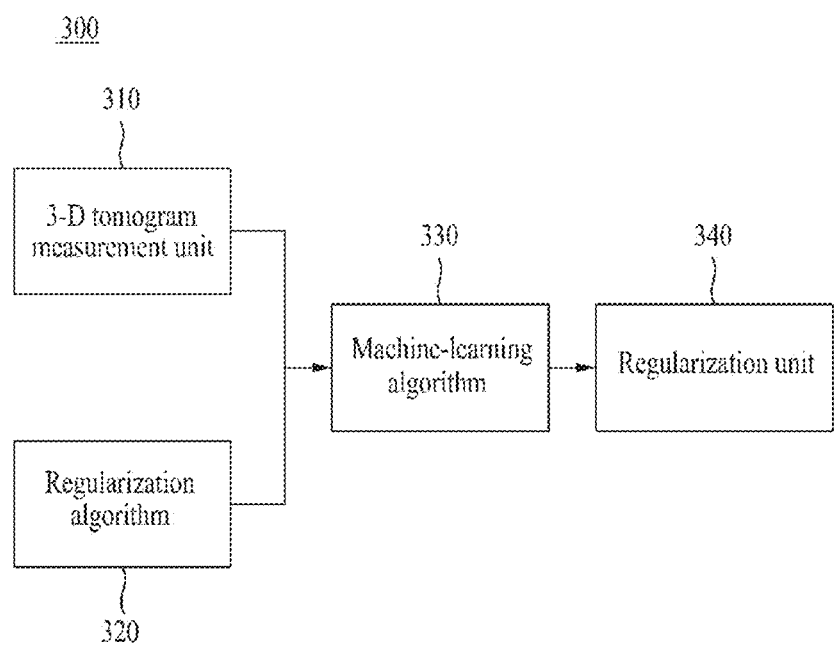
FIG. 3 is a block diagram illustrating an apparatus for regularizing 3-D tomography using a machine-learning algorithm according to an embodiment.

FIG. 3 is a block diagram illustrating an apparatus for regularizing 3-D tomography using a machine-learning algorithm according to an embodiment.

Referring to FIG. 3, an apparatus 300 for regularizing 3-D tomography using a machine-learning algorithm according to an embodiment may include a 3-D tomogram measurement unit 310, a regularization algorithm 320 and a machine-learning algorithm 330. According to an embodiment, the apparatus 300 for regularizing 3-D tomography using a machine-learning algorithm may further include a regularization unit 340.

In step 210, the 3-D tomogram measurement unit 310 may obtain a raw tomogram of a cell by measuring a 3-D tomogram of the cell.

The 3-D tomogram measurement unit 310 may optically measure a distribution of 3-D refractive indices of the cell. For example, the 3-D refractive index measurement unit 310 may be an optical system composed of a light source, a camera, etc., and may be constructed in various forms, such as a reflection type and a transmission type.

The 3-D refractive index measurement unit 310 may include a light source, an interferometer and a measurement unit. The light source may let light incident on a cell. For example, a laser may be used as the light source. The light source may radiate a laser beam to a sample, such as a cell to be measured. The light source used may use a single-wavelength laser. Furthermore, the light source may also use a large amount of information to identify a cell by measuring a 3-D refractive index in each wavelength by using a multi-wavelength laser.

In this case, the cell may be represented as a sample indicative of a target to be measured, and may be a bacteria or a microorganism in addition to a cell, and may be an object including a cell, etc.

The interferometer may obtain multiple 2-D holograms by measuring transmission light diffracted by a cell after light incident from the light source is incident on the cell. In this case, the interferometer is a measuring instrument using an interference phenomenon of light, and is a tool for monitoring an interference phenomenon occurring when two pieces of light meet again after light emitted from the same light source is divided into the two pieces of light so that there is a difference between the progress paths of the two pieces of light.

The measurement unit may measure a distribution of 3-D refractive indices of a cell by using multiple 2-D holograms obtained by the interferometer. For example, a camera, that is, an imaging apparatus for photographing an image, may be used as the measurement unit.

Such a 3-D refractive index measurement unit 310 may measure a distribution of 3-D refractive indices of a cell through at least one optical measurement among optical diffraction tomography and optical projection tomography.

The 3-D tomogram measurement unit 310 may measure a 3-D refractive index image of a cell by using an incident light rotation method using illumination at a plurality of angles or may obtain a 3-D refractive index image of a cell by using a plurality of 2-D images measured while rotating the cell (sample rotation) or translating the cell.

In step 220, a regularized tomogram may be obtained using the regularization algorithm 320. The regularization algorithm 320 may obtain a regulated refractive index image corresponding to each image through regularization, such as a total variation, and may form a paired dataset of the raw tomogram and the regularized tomogram.

In step 230, the machine-learning algorithm 330 may learn a relation between the raw tomogram and the regularized tomogram. The machine-learning algorithm 330 may extract a specific feature of a cell type by learning a non-linear relation between paired datasets of the raw tomogram and the regularized tomogram.

In this case, the machine-learning algorithm 330 may be composed of a deep learning algorithm (e.g., a deep neural network (DNN)) or a convolutional neural network (CNN) algorithm. Accordingly, a refractive index feature specific to a cell type may be extracted through the deep learning algorithm or the CNN algorithm by using the measured raw tomogram of the cell.

In step 240, the regularization unit 340 may regularize the measured 3-D tomogram of the cell by using the trained machine-learning algorithm.

The regularization unit 340 may output a regularized tomogram by inputting the measured raw tomogram to the deep learning algorithm or the CNN algorithm, and may identify the type of cell by applying the regularized tomogram. In particular, the regularization unit 340 may regularize the measured 3-D tomogram of the cell, through a contraction path of extracting, from raw tomogram data of the cell, a specific feature through the sequential application of convolution and subsampling for each path and an expansion path of outputting regularized tomogram data having the same size as an input value through the sequential application of convolution and subsampling for each path.

A method of measuring 3-D tomogram (refractive index) of a cell is described below.

Figure 4A:
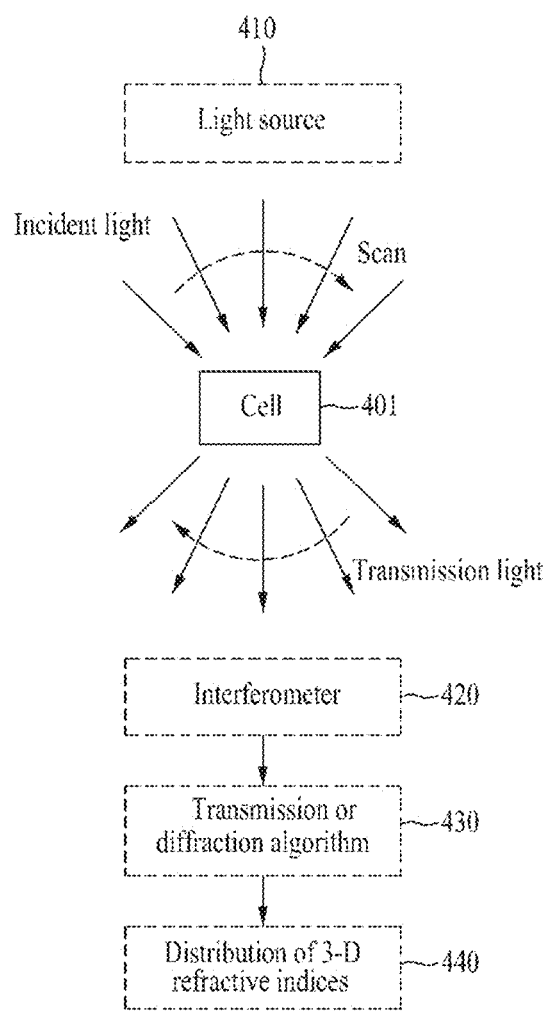
FIG. 4a is a diagram for describing a method of measuring a 3-D refractive index of a cell using an incident light rotation method according to an embodiment.
Figure 4B:
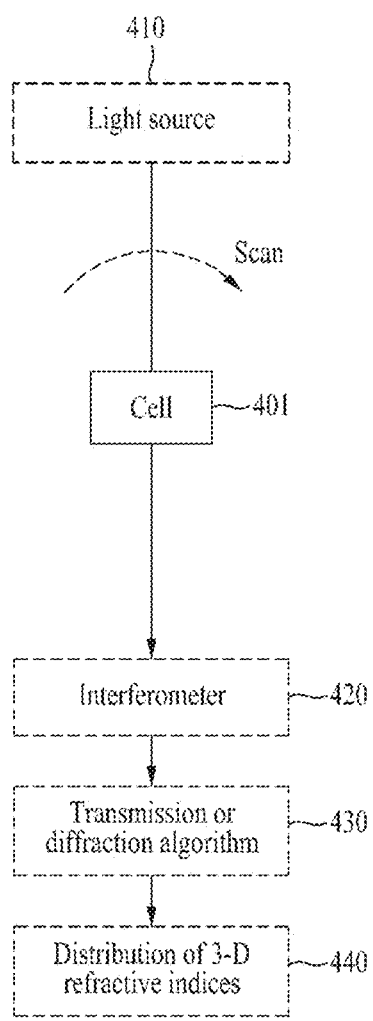
FIG. 4b is a diagram for describing a method of measuring a 3-D refractive index of a cell using a cell rotation method according to an embodiment.
Figure 4C:
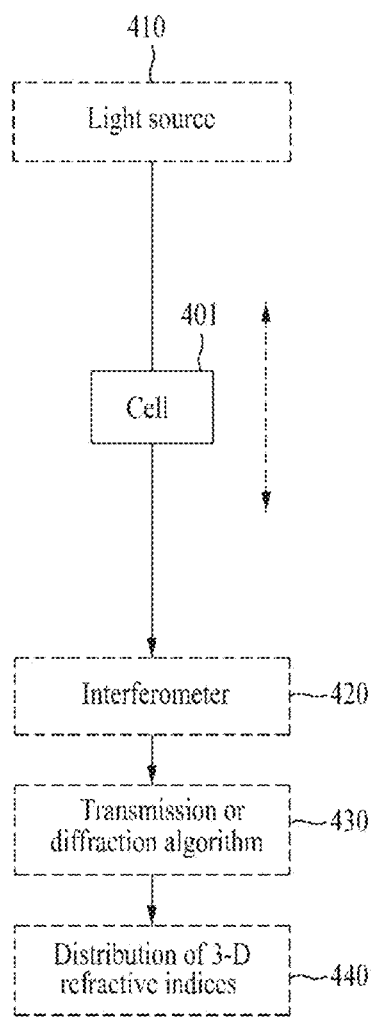
FIG. 4c is a diagram for describing a method of measuring a 3-D refractive index of a cell using a sample translation method according to an embodiment.

FIG. 4a is a diagram for describing a method of measuring a 3-D refractive index of a cell using an incident light rotation method according to an embodiment. Furthermore, FIG. 4b is a diagram for describing a method of measuring a 3-D refractive index of a cell using a cell rotation method according to an embodiment. Furthermore, FIG. 4c is a diagram for describing a method of measuring a 3-D refractive index of a cell using a sample translation method according to an embodiment.

The present embodiments may be applied to all types of 3-D tomograms. In this case, the present embodiments are described based on a refractive index owned by all things among a 3-D tomogram. The refractive index is a unique optical physical quantity of a material that describes how the speed is decelerated when light passes through the material.

In order to measure a 3-D refractive index of a cell 401, optical diffraction tomography or optical projection tomography (tomographic phase microscopy, 3D digital holographic microscopy, 3D quantitative phase imaging) may be used (Non-patent Document 1). FIGS. 4a to 4c illustrate possible various measurement optical implementations.

As illustrated in FIG. 4a, the optical diffraction tomography and the optical projection tomography may use the same optical implementation (Non-patent Document 2 and Non-patent Document 4). Light emitted from a coherent light source 410 may be incident on the cell 401. A hologram of transmission light diffracted by the cell 401 may be measured by using an interferometer 420.

In this case, a distribution of 3-D refractive indices 440 of the cell 401 may be measured by using several sheets of 2-D holograms measured while rotating (scanning) an angle at which the light is incident on the cell 401. However, a difference between the diffraction tomography and the projection tomography is a restoration algorithm 430 in which whether light in the sample is diffracted is taken into consideration.

Referring to FIG. 4b, a distribution of the 3-D refractive indices 440 may be measured by directly rotating the cell 401, instead of rotating the incident light in the method of measuring a distribution of the 3-D refractive indices of the cell 401 using the incident light rotation method described with reference to FIG. 4a.

Furthermore, referring to FIG. 4c, a distribution of the 3-D refractive indices may be measured in several sheets of 2-D images while directly translating the cell 401 in the direction of an optical axis, instead of rotating the incident light in the method of measuring a distribution of the 3-D refractive indices of the cell 401 using the incident light rotation method described with reference to FIG. 4a.

Meanwhile, a method of measuring the cell 401 may include a form in which the cells 401 are placed at a low concentration on an in vitro slide glass, a form in which the cells 401 form a single layer or several layers at a high concentration on an in vitro slide glass, a tissue slide form in which a bio tissue slide is cut to a thickness between 5 micrometers and 200 micrometers, a form in which the cell 401 is placed on an in vitro multi-well plate, or a form in which cells pass through a microfluidic channel for high-throughput screening in vitro.

A single-wavelength laser may be used as the light source. Furthermore, a low-coherence light source having a wavelength width (full-width half-maximum of a spectral bandwidth) of 1 nm or more to 100 nm or less may be used. Furthermore, a larger amount of information may be used to identify the cell 401 by measuring a 3-D refractive index in each center wavelength by using a combination of lasers or low-coherence light sources having several center wavelengths.

Figure 5:
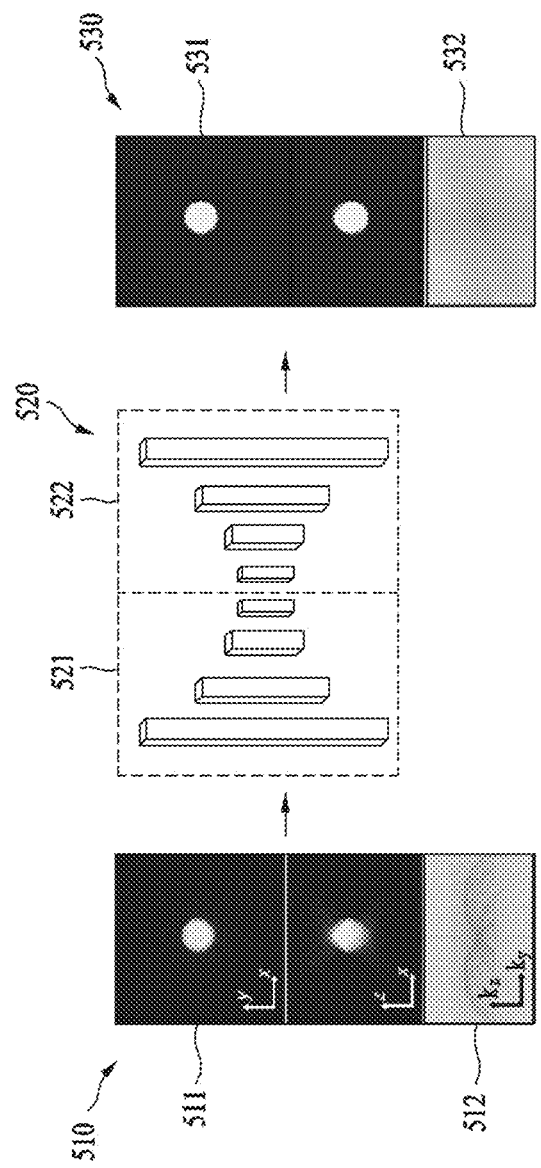
FIG. 5 is a diagram for describing a method of regularizing 3-D tomography using a convolutional neural network according to an embodiment.

FIG. 5 is a diagram for describing a method of regularizing 3-D tomography using a convolutional neural network according to an embodiment.

3-D refractive index images of cells whose types have already been classified may be measured using the methods described with reference to FIGS. 4a to 4c. Referring to FIG. 5, a regularized tomogram 530 corresponding to each image may be obtained through regularization, such as a total variation, and a paired dataset of a "raw tomogram 510— regularized tomogram 530" may be formed. In this case, after a large number (>100) of samples are measured for each type, a specific feature may be extracted by learning a complicated nonlinear relation between the paired dataset by using a deep learning algorithm or CNN algorithm 520. In this case, the raw tomogram 510 may be represented a 3-D refractive index image 511 or a spatial frequency spectrum 512. Furthermore, the regularized tomogram 530 may be represented as a 3-D refractive index image 531 or a spatial frequency spectrum 532.

Specifically, the CNN algorithm 520 may be used based on measured 3-D refractive index information. In this case, information inputted to the CNN algorithm 520 is the raw tomogram 510, that is, 3-D refractive index information of each cell. A predictive value obtained as the results of machine learning accordingly is the regularized tomogram 530, that is, regularized 3-D refractive index information filled with spatial frequency information ($k_z$) that has not been physically measured. In general, the predictive value obtained as the results of machine learning is a 3-D tomogram.

First, a specific feature may be extracted (feature extraction) from the 3-D refractive index tomogram data (i.e., the raw tomogram) 510 through the sequential application of convolution and subsampling for each path in a contraction path 521. In an expansion path 522, regularized 3-D refractive index information having the same size as an input value, that is, the regularized tomogram 530, may be outputted again through the sequential application of convolution and subsampling for each path.

In this case, if refractive index information composed in a 3-D form is n(x, y, z), a specific feature may be directly extracted from the refractive index information in a 3-D matrix form. A spatial location (x, y, z) may be transformed into a spatial frequency location (kx, ky, kz) through a Fourier transform, etc. and used.

Regularization may be performed by applying to a specific feature of a cell type obtained using the aforementioned method by using a distribution of 3-D refractive indices of a specific cell. In this case, efficiency of deep learning can be increased by using both a real part of a refractive index related to the deceleration of light within a material and an imaginary part of a refractive index related to the absorption of the light. Efficiency of deep learning can also be increased by using spatial frequency information as the input value of the algorithm.

According to embodiments, a 3-D tomogram can be rapidly regularized within several seconds. This technology enables regularization of a several-second scale, unlike a conventional regularization method based on iterative optimization using a gradient descent, which is taken several minutes to several hours. Accordingly, a large number of 3-D tomograms can be regularized in real time.

In this case, the present disclosure has been described by being applied to an optical tomography technology for measuring a distribution of 3-D refractive indices, but may be applied to wide tomography technologies, for example, an x-ray, electron microscopy computed tomography (CT), magnetic resonance imaging (MRI), etc. Thereafter, a fast regularization method can be realized through deep learning by using a pair of a physically measured 3-D tomogram and a tomogram regularized using a conventional algorithm. Furthermore, a deep learning algorithm that has learnt a regularization algorithm parameter first found by a user enables rapid regularization without additional parameter search or optimization when receiving a new tomogram input value.

Optical diffraction tomography (ODT) may visualize a biochemical phenomenon in a non-destructive manner in a nano scale by measuring a 3-D refractive index (RI) map of a sample. One major disadvantage of the ODT is that axial resolution is poor because access to a 3D light transmission function is limited. Such a missing cone problem may be solved through a regularization algorithm using priority information, such as non-negativity and sample smoothness. However, real-time visualization is impossible due to an iterative feature and parameter dependency.

Accordingly, an embodiment may provide a machine-learning algorithm, such as a deep neural network (DNN), which rapidly improves resolution of a 3D refractive index map through the method of regularizing 3-D tomography using a machine-learning algorithm.

In this case, the 3D-based CNN may learn a transform between two tomogram domains through a paired dataset (a raw tomogram/regularized tomogram having improved resolution through an iterative total variation algorithm).

Figure 6:
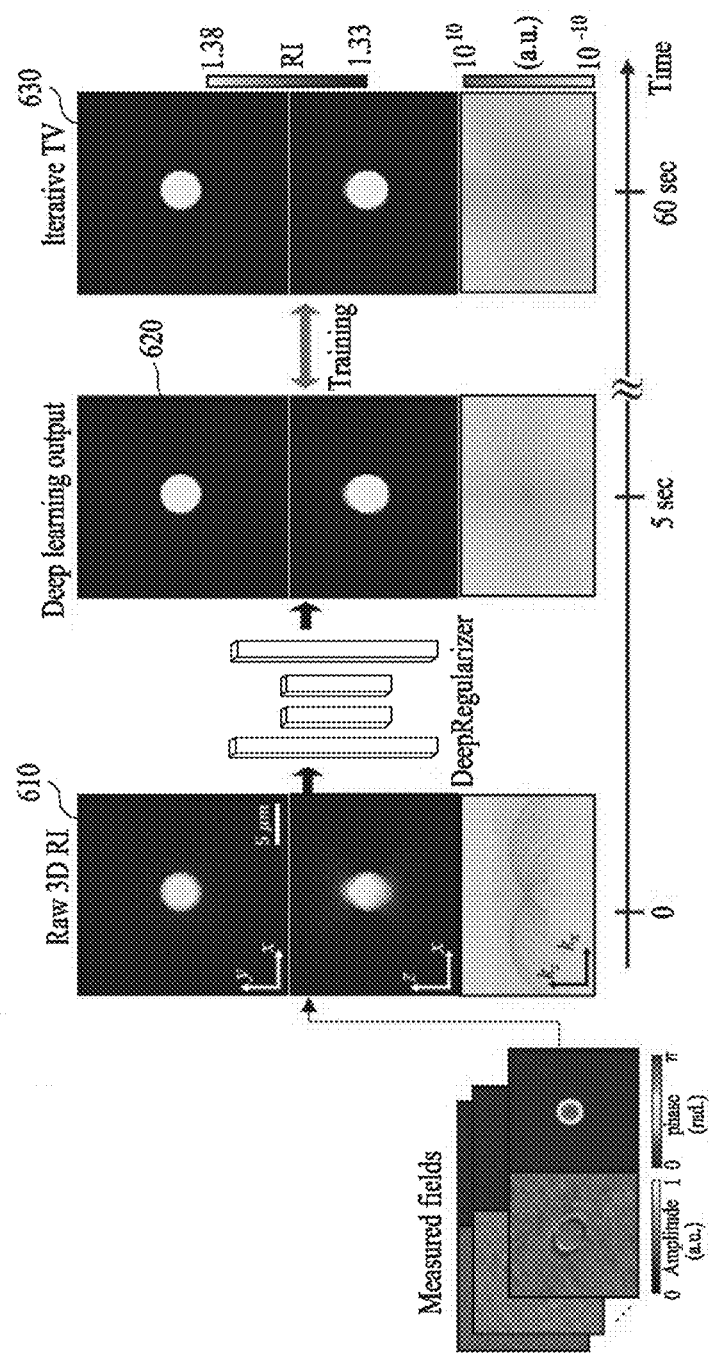
FIG. 6 is a diagram illustrating optical diffraction tomography (ODT) and a regularization process using a machine-learning algorithm according to an embodiment.

FIG. 6 is a diagram illustrating optical diffraction tomography (ODT) and a regularization process using a machine-learning algorithm according to an embodiment.

FIG. 6 illustrates an optical diffraction tomography (ODT) and regularization process using a 3D deep neural network, that is, a machine-learning algorithm, and the existing iterative total variation (TV) algorithm. The ODT uses scattered fields of microbeads at various angles in order to reconstruct a 3D refractive index (RI) through a Fourier diffraction theory.

In the method of regularizing 3-D tomography using a machine-learning algorithm according to an embodiment, a raw tomogram 610 is regularized using a machine-learning algorithm. A regularized tomogram 620 may be regularized within five seconds. In contrast, about 1 minute is taken for the optimization of the existing iterative total variation (TV) algorithm 630.

Figure 7:
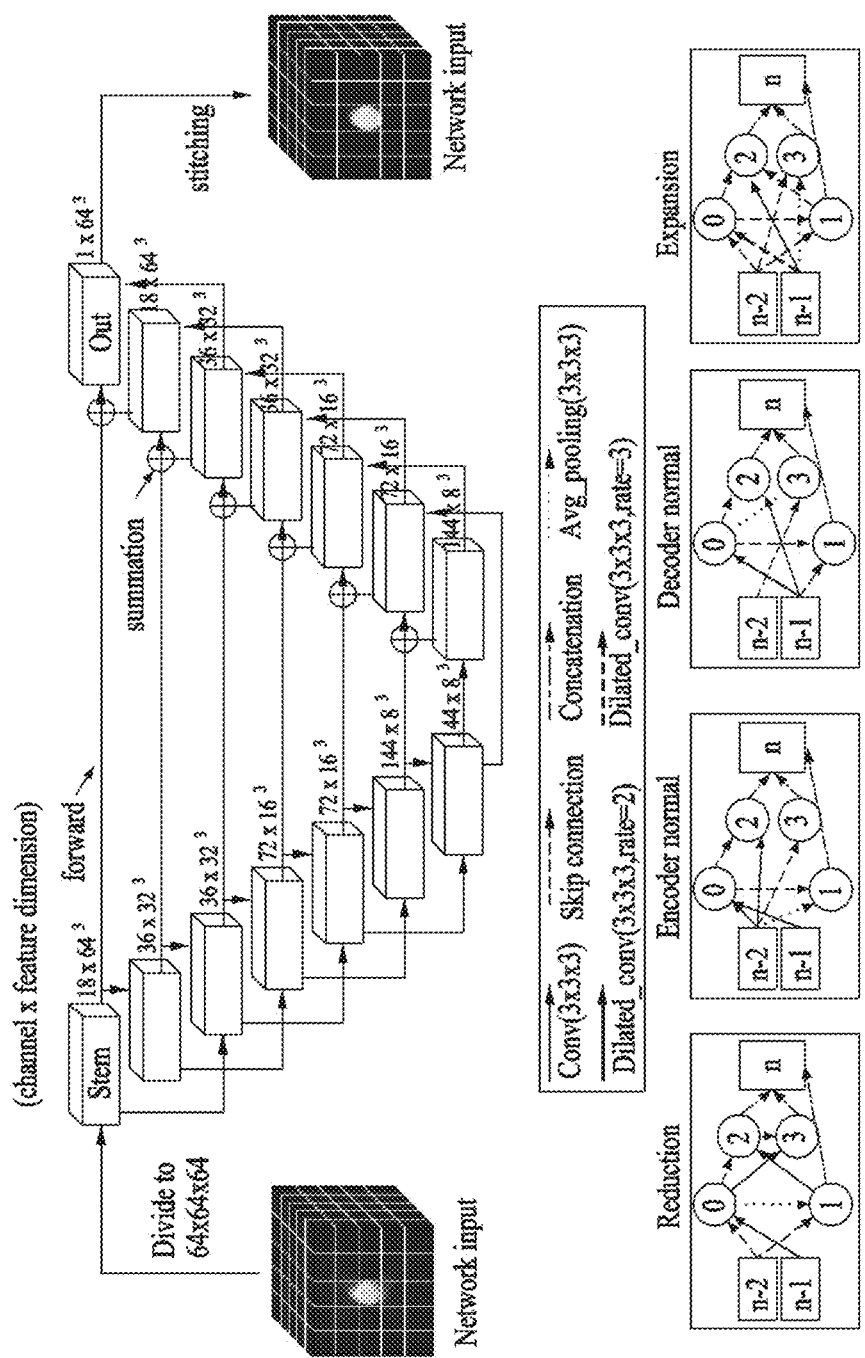
FIG. 7 is a diagram for describing a structure of the machine-learning algorithm according to an embodiment.

FIG. 7 is a diagram for describing a structure of the machine-learning algorithm according to an embodiment.

Referring to FIG. 7, a trained 3-D deep neural network regularizes a tomogram patch (64×64×64), and may concatenate all the regularized patches to a total tomogram only within several seconds. Four cells (reduction, encoder normal, decoder normal, and expansion) are alternatively in downsampling and upsampling paths. Each cell is composed of a 3-D convolution operation (64×64×64), a skip connection, a concatenation, average pooling (3×3×3), and expansion convolution (3×3×3, rate=2 or 3). Standard convolution is used in the reduction and encoder normal cells in the downsampling path. Expansion convolution is used in the decoder normal and expansion cells in the upsampling path in order to preserve feature information and efficiently expand a feature dimension.

The aforementioned apparatus may be implemented as a hardware component, a software component and/or a combination of a hardware component and a software component. For example, the apparatus and component described in the embodiments may be implemented using a processor, a controller, an arithmetic logic unit (ALU), a digital signal processor, a microcomputer, a field programmable gate array (FPGA), a programmable logic unit (PLU), a microprocessor or one or more general-purpose computers or special-purpose computers, such as any other apparatus capable of executing or responding to an instruction. The processing apparatus may perform an operating system (OS) and one or more software applications executed on the OS. Furthermore, the processing apparatus may access, store, manipulate, process and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, a different processing configuration, such as a parallel processor, is also possible.

Software may include a computer program, a code, an instruction or a combination of one or more of them, and may configure a processing apparatus so that the processing apparatus operates as desired or may instruct the processing apparatuses independently or collectively. The software and/or the data may be embodied in any type of machine, a component, a physical apparatus, a computer storage medium or a apparatus in order to be interpreted by the processor or to provide an instruction or data to the processing apparatus. The software may be distributed to computer systems connected over a network and may be stored or executed in a distributed manner. The software and the data may be stored in one or more computer-readable recording media.

The method according to an embodiment may be implemented in the form of a program instruction executable by various computer means and recorded on a computer-readable recording medium. The computer-readable recording medium may include a program instruction, a data file, and a data structure alone or in combination. The program instruction recorded on the medium may be specially designed and constructed for an embodiment, or may be known and available to those skilled in the computer software field. Examples of the computer-readable medium include magnetic media such as a hard disk, a floppy disk and a magnetic tape, optical media such as a CD-ROM and a DVD, magneto-optical media such as a floptical disk, and hardware devices specially configured to store and execute a program instruction, such as a ROM, a RAM, and a flash memory. Examples of the program instruction include not only machine language code produced by a compiler, but a high-level language code which may be executed by a computer using an interpreter, etc.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

Accordingly, other implementations, other embodiments, and the equivalents of the claims fall within the scope of the claims.

The invention claimed is:

1. A method of regularizing three-dimensional (3-D) tomography using a machine-learning algorithm, the method comprising:
   obtaining a raw tomogram of a cell by measuring a 3-D tomogram of a cell, the measured 3-D tomogram including a distribution of 3-D refractive indices of the cell;
   obtaining a regularized tomogram by using a regularization algorithm;
   learning a relation between the raw tomogram and the regularized tomogram through a machine-learning algorithm; and
   regularizing the measured 3-D tomogram of the cell by using the trained machine-learning algorithm,
   wherein obtaining the regularized tomogram by using the regularization algorithm comprises:
      obtaining a regulated refractive index image corresponding to each image through total variation regularization, and
      forming a paired dataset of the raw tomogram and the regularized tomogram,
   wherein learning the relation between the raw tomogram and the regularized tomogram through the machine-learning algorithm comprises:
      extracting a specific feature of a cell type by learning a non-linear relation between the paired dataset of the raw tomogram and the regularized tomogram through the machine-learning algorithm,
   wherein the specific feature comprises 3-D refractive index information for cells of the cell type including a real part of a refractive index of the cells and an imaginary part of the refractive index of the cells,
   wherein the regularizing comprises:
      outputting the regularized tomogram of the measured 3-D tomogram by inputting the measured 3-D tomogram to a convolutional neural network (CNN) algorithm and applying the specific feature to the distribution of 3-D refractive indices of the measured 3-D tomogram, and
      identifying a type of the cell using the regularized tomogram.

2. The method of claim 1, wherein obtaining a raw tomogram of a cell by measuring a 3-D tomogram of a cell comprises
   measuring a 3-D refractive index image of the cell by using an incident light rotation method using illumination at a plurality of angles or
   obtaining a 3-D refractive index image of the cell by using a plurality of two-dimensional (2-D) images measured while rotating the cell (sample rotation) or translating the cell.

3. The method of claim 1, wherein regularizing the measured 3-D tomogram of the cell by using the machine-learning algorithm comprises:
   a contraction path of extracting a specific feature from raw tomogram data of the cell through sequential application of convolution and subsampling for each path; and
   an expansion path of outputting regularized tomogram data of the regularized tomogram of the measured 3-D tomogram having a size identical with an input value through the sequential application of convolution and subsampling for each path.

4. An apparatus for regularizing three-dimensional (3-D) tomography using a machine-learning algorithm, the apparatus comprising:
   a 3-D tomogram measurement unit configured to obtain a raw tomogram of a cell by measuring a 3-D tomogram of a cell, the measured 3-D tomogram including a distribution of 3-D refractive indices of the cell;
   a regularization algorithm configured to obtain a regularized tomogram;
   a machine-learning algorithm configured to learn a relation between the raw tomogram and the regularized tomogram; and
   a regularization unit configured to regularize the measured 3-D tomogram of the cell by using the trained machine-learning algorithm,
   wherein the regularization algorithm is configured to:
      obtain a regulated refractive index image corresponding to each image through total variation regularization, and
      form a paired dataset of the raw tomogram and the regularized tomogram
   wherein the machine-learning algorithm is configured to:
      extract a specific feature of a cell type by learning a non-linear relation between the paired dataset of the raw tomogram and the regularized tomogram through the machine-learning algorithm,
   wherein the specific feature comprises 3-D refractive index information for cells of the cell type including a real part of a refractive index of the cells and an imaginary part of the refractive index of the cells,
   wherein the regularization unit is configured to:
      output regularized tomogram of the measured 3-D tomogram by inputting the measured 3-D tomogram to a convolutional neural network (CNN) algorithm and applying the specific feature to the distribution of 3-D refractive indices of the measured 3-D tomogram, and
      identify a type of the cell using the regularized tomogram.

* * * * *

UNITED STATES PATENT AND TRADEMARK OFFICE
CERTIFICATE OF CORRECTION

PATENT NO. : 12,141,897 B2
APPLICATION NO. : 17/753452
DATED : November 12, 2024
INVENTOR(S) : Park et al.

Page 1 of 1

It is certified that error appears in the above-identified patent and that said Letters Patent is hereby corrected as shown below:

On the Title Page

Item (57), under ABSTRACT, Line 1, delete "are a" and insert -- is a --, therefor.

In the Claims

In Column 11, Claim 2, Line 53, delete "comprises" and insert -- comprises: --, therefor.

In Column 11, Claim 2, Line 56, delete "angles or" and insert -- angles, or --, therefor.

In Column 12, Claim 4, Line 36, delete "tomogram" and insert -- tomogram, --, therefor.

Signed and Sealed this
Twenty-first Day of January, 2025

Coke Morgan Stewart
*Acting Director of the United States Patent and Trademark Office*